D. GOFF.
HAY-RACK.
No. 185,524. Patented Dec. 19, 1876.
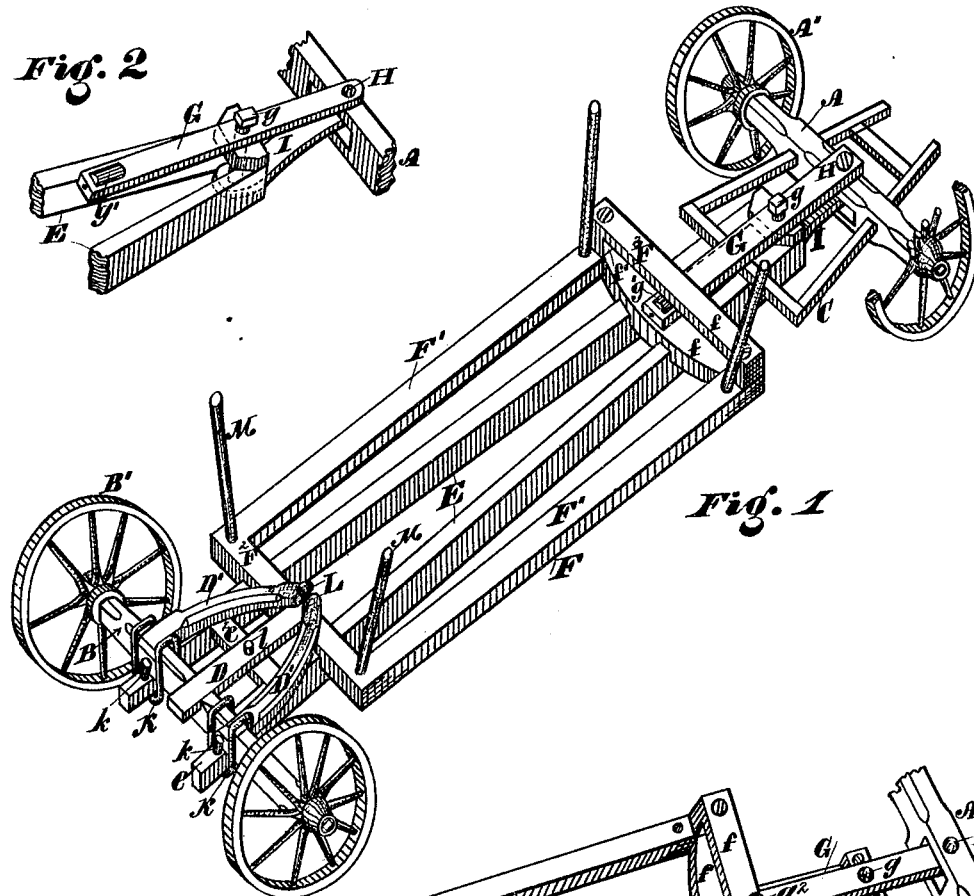

UNITED STATES PATENT OFFICE.

DANIEL GOFF, OF BELLE PLAIN, NEW JERSEY.

IMPROVEMENT IN HAY-RACKS.

Specification forming part of Letters Patent No. 185,524, dated December 19, 1876; application filed November 22, 1876.

*To all whom it may concern:*

Be it known that I, DANIEL GOFF, of Belle Plain, in the county of Cumberland and State of New Jersey, have invented certain new and useful Improvements in Farm-Wagons; and I do hereby declare the following to be a full, clear, and exact description of the invention, such as will enable others skilled in the art to which it pertains to make and use it, reference being had to the accompanying drawings, which form part of this specification, in which—

Figure 1 is a perspective of my invention. Fig. 2 is a detail perspective. Fig. 3 is a perspective of a modification; Fig. 4, a detail view.

The object of my invention is to provide at slight expense a vehicle adapted to farm purposes generally, and particularly to the hauling of fodder from the field to the barn or stack.

My invention consists, essentially, in the provision of a simply-constructed frame, adapted to the reception and holding of fodder and other like farm produce, said frame being constructed and designed to be secured or mounted upon the front and hind wheels of a common market-wagon—the bed or body of the latter being removed for that purpose—in such manner that it will rest low down or near the ground, in order to permit its being loaded with ease and facility.

My invention consists, further, in the provision of means whereby the frame—which is intended to be considerably longer than the bed of an ordinary wagon—may be readily turned within about its own length.

My invention still further consists in certain details of construction hereinafter more fully set forth.

Referring to the accompanying drawing, A represents the front, and B the rear, axle of a common market or other wagon, mounted, respectively, on wheels A' and B', the bed or body of such wagon being removed, leaving, however, the hounds C and perch and stays D D'. E E represent two long converging bars or beams, on which is secured an oblong frame, F, composed of the side bars $F^1$ and cross-bars $F^2 F^3$, the latter being in two pieces, $f f$, between which the forward ends of the side bars $F^1$ rest, leaving an opening or slot, $f'$. G represents an arm or lever pivoted at $g$ on the forward end of the bars E E and secured to the front axle by the king-bolt H or an equivalent screw or rod. The rear end of said arm is provided with an anti-friction roller, $g'$, which plays in the slot $f'$. I represents a supplemental draw-rod, fitting in the opening in the front axle usually occupied by the forward end of the perch, the pivotal bolt $g$ and king-bolt H passing through its opposite extremities. The rear ends of the bars E E are cut away, as shown at $e\ e$, forming rabbets on which the axle B rest, said axle and bars being firmly held in position by metal clips K K passing around the latter and hooking over the former, and by pins $k\ k$. L $l$ represent bolts, which pass into the cross-bars $F^2 e^2$, respectively, and M M are uprights at the four corners of the frame F. In this way a vehicle of great length may be cheaply constructed, the frame and its appurtenances being readily adapted to the axles of an ordinary wagon by simply removing the bed of the latter. At the same time it may be readily turned within about its own length, the connection with the front axle by means of the pivoted arm G permitting the wheels A' to swing around until one of them meets the adjacent bar E, as shown plainly in Fig. 4.

For heavy hauling the draw-bar I should be employed; but for light loads said bar may be dispensed with, and the arm G alone employed, as shown in Fig. 3. In this case the arm G should be provided with a pin, $g^2$, to pass into the bar $F^3$ and remain there until it is required to turn the vehicle, when it will be withdrawn, allowing the rear end of said arm to swing around in the slot $f'$, as shown in Fig. 4.

To disconnect the frame from the axles the pins $k\ k$ and bolts L $l$ are first withdrawn, allowing said frame to be drawn forward and away from the axle B, the clips K K being then unhooked from the latter. The bolts $g$ and H are then lifted out, permitting the front axle to be drawn away from the frame.

What I claim as my invention is—

1. A vehicle for hauling fodder and farm produce, composed of axles A B mounted on wheels, frame E F, and pivoted arm G, said arm forming a connection between the axle A and frame E F, substantially as shown and described.

2. In combination with the axle B and bars E E, the clips K K passing around the latter and hooking over the former, substantially as shown and set forth.

3. In combination with the bars E E and axle A, the draw-bar I pivoted at opposite ends on the bolts $g$ H, substantially as shown and described.

4. In combination with the axle A and frame-pieces $F^3$, formed with an opening or slot, $f'$, the bar G, pivoted at $g$ and provided with an anti-friction roller, $g'$, substantially as shown and described.

5. The combination of axles A B, frame E F, pivoted arm G, clips K, and pins $k$, the several parts being constructed and arranged for operation, substantially as shown and described.

In testimony that I claim the foregoing I have hereunto set my hand this 15th day of November, 1876.

DANIEL GOFF.

Witnesses:
GEO. C. SHELMERDINE,
SAML. J. VAN STAVOREN.